Sept. 19, 1967        A. F. HALL        3,341,934
RIVETING
Filed Nov. 30, 1964
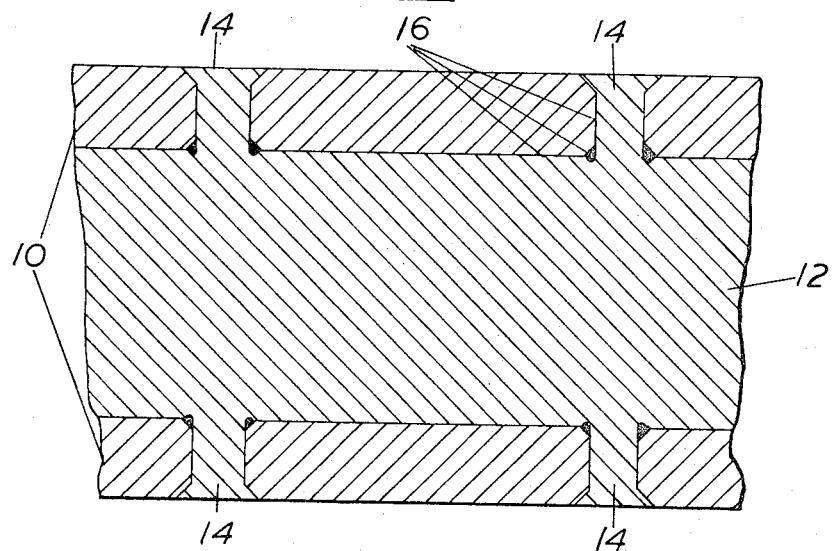
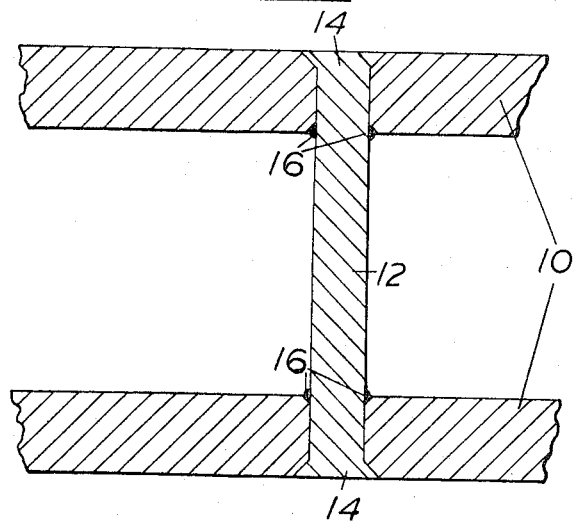
Inventor
ALAN FRANK HALL
By
Cushman Darby Cushman
Attorneys 3,341,934
RIVETING
Alan Frank Hall, Norton-on-Tees, England, assignor to Imperial Chemical Industries Limited, London, England, a corporation of Great Britain
Filed Nov. 30, 1964, Ser. No. 414,563
Claims priority, application Great Britain, Dec. 4, 1963, 47,941/63
8 Claims. (Cl. 29—458)

This invention relates to improvements in riveting applicable to many types of riveted structure, for example, compressor impeller wheels.

According to the invention there is provided a method of riveting which comprises coating a metal rivet, and/or coating the interior of a hole which is to receive the rivet, with a quantity of a viscous liquid curable resin in excess of that required to fill the space between the rivet and the interior surface of its hole, mating the rivet with the hole, closing the rivet and thereafter curing the resin.

Also according to the invention there is provided a structure, having some at least of its component parts riveted together by the method of the invention.

The resin is preferably one which, when applied in the uncured state to the rivet or to the hole which is to receive the rivet, adheres to the surface to which it is applied whilst remaining sufficiently fluid to spread to every cranny when the rivet is mated with its hole. The excess quantity of resin is required so that the rivet roots are protected by resin squeezed out of the rivet hole. For convenience its "pot life," that is, the period during which the resin is workable, should be at least 24 hours.

The resin is preferably one which is curable by heat: heat can usually be applied in a simple manner after assembly of the riveted structure. The resin is preferably one which does not change its volume by more than about 0.2% on curing.

The resin is preferably one which when cured is stable to heat, for example temperatures of about 300° C., for a time, e.g., a few minutes, sufficient to permit subsequent heat treatments, e.g., in assembly operation.

Curable resins impermeable to many metal corrodants, for example, water and aqueous solutions of acids and alkalies, are available. This makes it possible to use the invention to make riveted structures less liable to failure due to stress corrosion and corrosion fatigue.

Resins having the required properties are available in the phenol formaldehyde, polyester or more conveniently epoxy resin classes.

The invention is particularly applicable in the manufacture of structures which may in use be subjected to variable stress, for example compressor impeller wheels, and specifically to radial flow impeller wheels, since it reduces the tendency of these structures to failure due to stress corrosion or corrosion fatigue. The method is believed to operate as follows. In multi-stage radial flow compressors, compression of the gas is accompanied by a rise in temperature, which is then compensated by interstage coolers. The resulting temperature drop coupled with the increase in pressure of the gas causes condensation of water contained in the gas together with any water-soluble impurities. In an impeller wheel riveted without resin the roots of the rivets are exposed and come into contact with the condensate. As such rivet roots are subject to high sresses, it is believed they become liable in the presence of a corrodant to failure due to stress corrosion or corrosion fatigue. By the invention the corrodant is prevented from coming into contact with the rivet roots.

A joint in a radial flow impeller wheel riveted by the method of the invention is shown in the accompanying drawings.

FIGURE 1 is a sectional view of the joint.
FIGURE 2 is a sectional view of the joint at right angles to the view in FIGURE 1.

Referring to the drawings, the shrouds 10, the impeller blade 12, and the rivets 14 formed integrally with the blade, are made of 13% chromium steel. The resin 16 is an epoxy resin Araldite (registered trademark) No. 105 containing finely divided silica as a filler and hardened with Araldite (registered trademark) hardener 972. This resin seals off the riveted joint from corrodants. The shrouds 10 are perforated with holes for the insertion of the integral rivets 14. The impeller blade 12 has integral rivets projecting from its two longitudinal edges and corresponding to the holes in the shrouds 10.

In making the joint by the method of the invention the integral rivets 14 and/or the holes into which the rivets were to be inserted were coated with Araldite (registered trademark) No. 105 containing the hardener and filler. The impeller blade 12 was then mated to the shrouds 10 by insertion of the integral rivets 14 into their corresponding holes in the shrouds 10. The Araldite (registered trademark) No. 105 containing the hardener and filler was squeezed by this mating into any free space between the integral rivet 14 and the hole and formed a bevelled seal between the impeller blade 12 and the shroud 10, giving a protective filling in and around the junction. The integral rivets 14 were then closed and upset to fill the countersinking. The epoxy resin 16 was then cured by the application of heat and formed the solid protective coating in and around the riveted joint. The assembled impeller wheel was then ready to be heat shrunk onto the compressor shaft by heating in an oil bath at about 300° C. for a few minutes and then mating the impeller wheel with the shaft.

In multi-stage radial flow compressors with interstage cooling impeller wheels riveted without resin were found on occasion to disintegrate unexpectedly after 1200 hours. An impeller wheel riveted according to the invention has been in continuous service now for 4200 hours.

I claim:
1. A method of riveting whereby the riveted joint is sealed which comprises applying to a metal rivet a quantity of a viscous liquid curable resin, in excess of that required to fill the space between the rivet and the interior surface of the hole which is to receive the rivet, mating the rivet with the hole, whereby the excess resin is squeezed out of the hole and forms a protective seal around the junction of the rivet with the hole, closing the rivet and thereafter curing the resin.

2. A method according to claim 1 wherein the resin is heat-curable.

3. A method according to claim 1 wherein the volume change of the resin on curing is less than 0.2%.

4. A method according to claim 1 wherein the cured resin is impermeable to dilute solutions of acids and alkalies.

5. A method according to claim 1 wherein the cured resin is stable at temperatures of about 300° C. for a time sufficient to permit subsequent assembly and fabrication stages.

6. A method according to claim 1 wherein the resin is an epoxy resin.

7. A compressor impeller wheel having shrouds, impeller blades connecting said shrouds by means of rivets formed integrally with the said blades, said rivets extending through receiving holes in said shrouds, and cured resin disposed between and in intimate contact with said rivets and the inside surface of said receiving holes and disposed around the junction of the said rivets and said shroud.

8. The impeller wheel of claim 7 wherein the said receiving holes are beveled and the said resin is disposed within said bevel.

References Cited

UNITED STATES PATENTS 2,957,237  10/1960  Regle et al. _____ 29—470.5

FOREIGN PATENTS 936,986  9/1963  Great Britain.

OTHER REFERENCES

Araldite: British Plastics, November 1948, pp. 521–527. (Copy in Group 325, Class 29, subclass 95–c.)

ANDREW R. JUHASZ, *Primary Examiner.*

GERALD A. DOST, *Examiner.*